April 10, 1956 S. J. CZARNIK 2,741,309
TUBE CUT-OFF DIE STRUCTURE
Filed Jan. 16, 1952 5 Sheets-Sheet 5

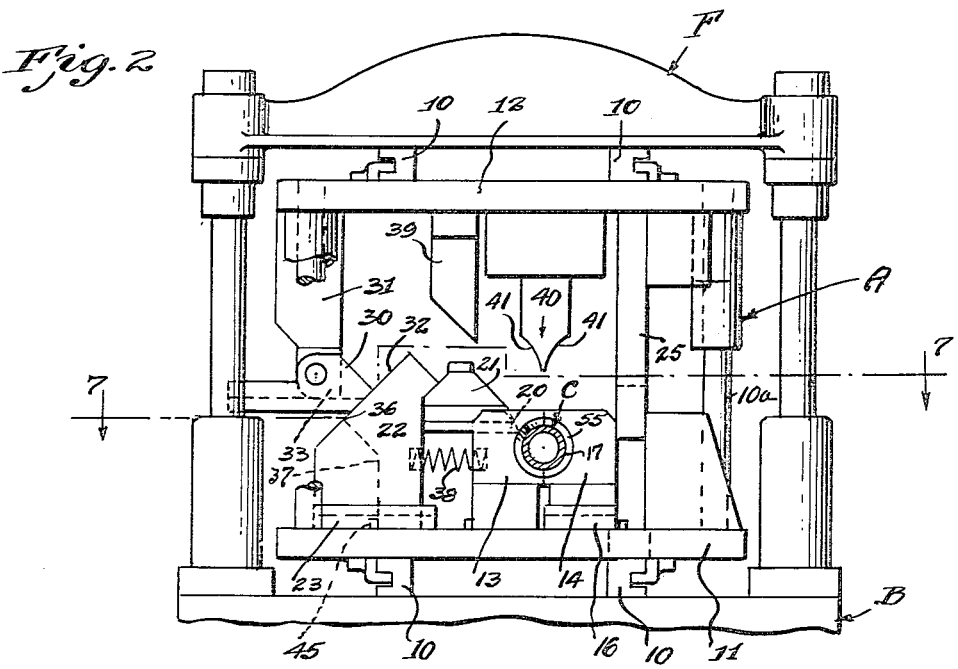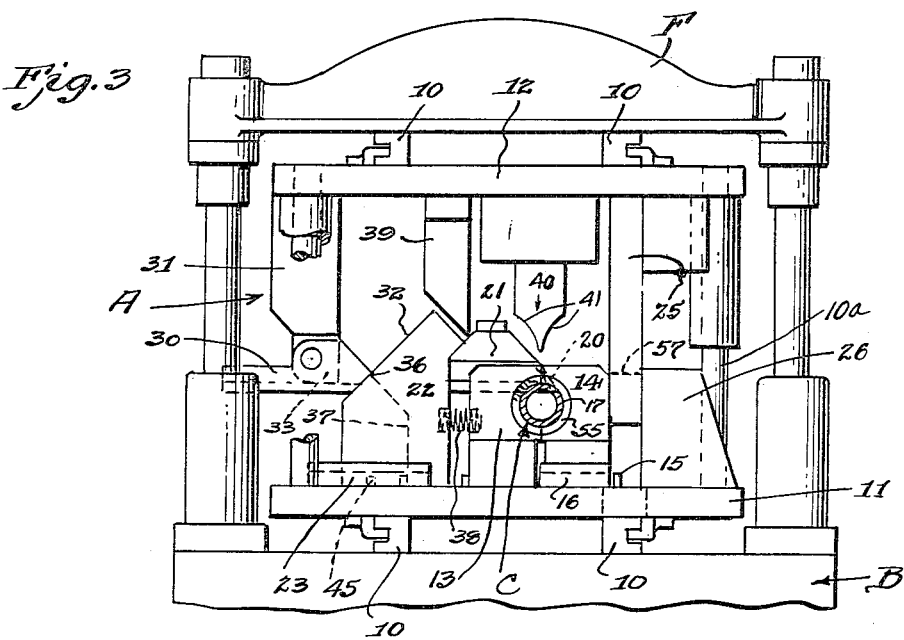

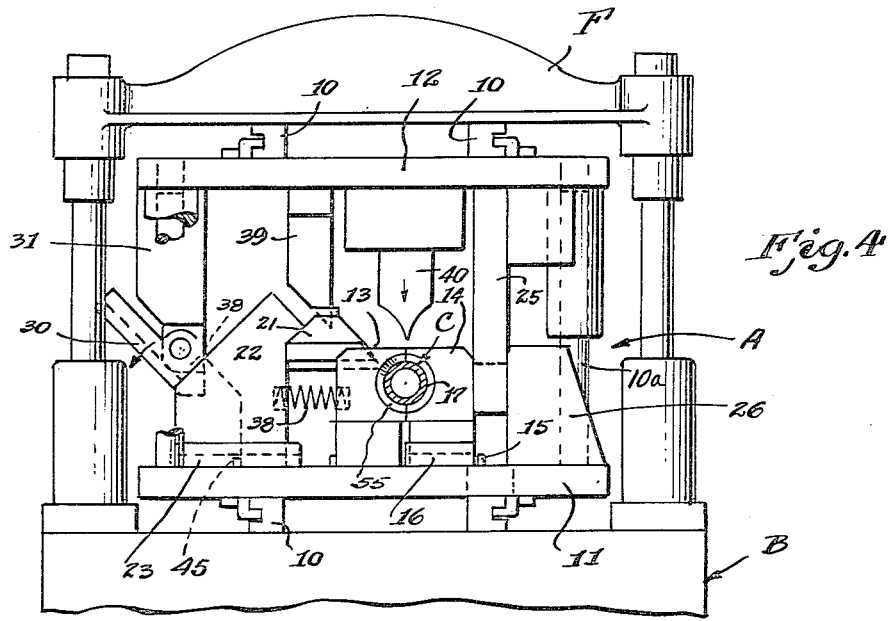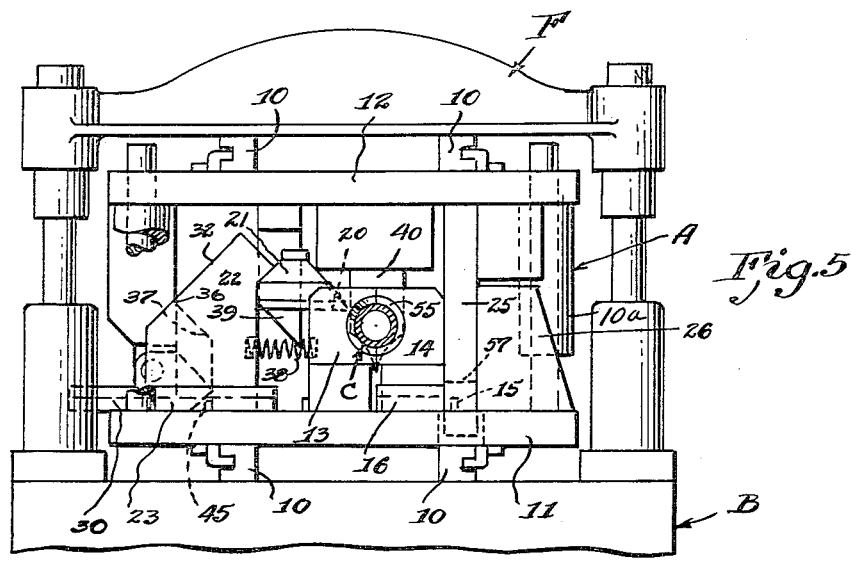

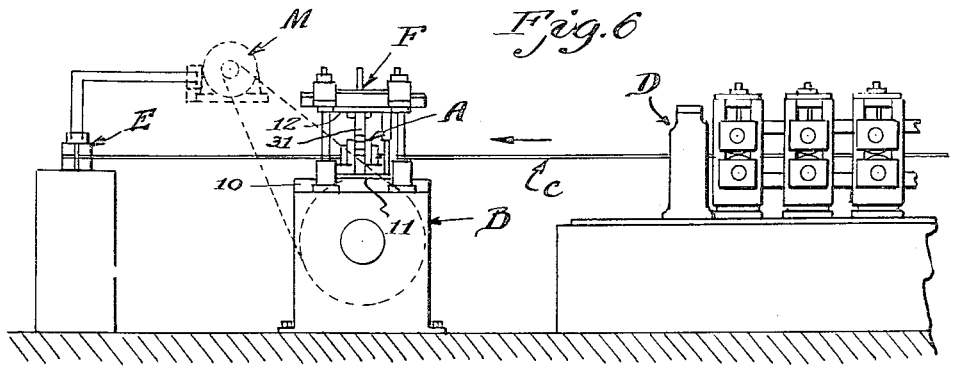
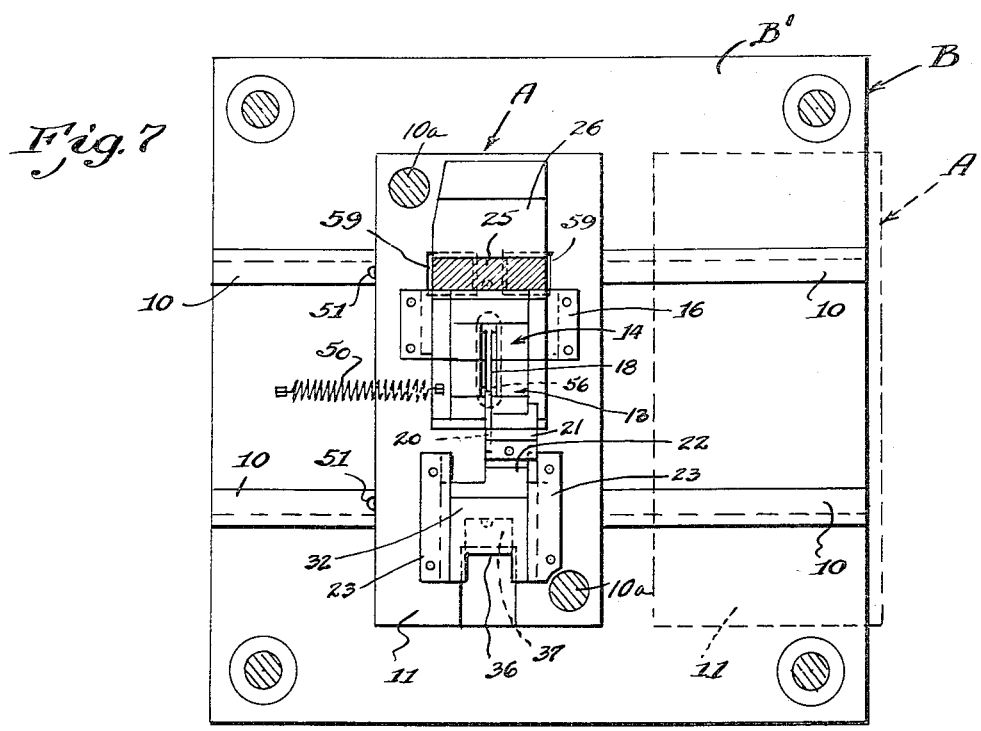
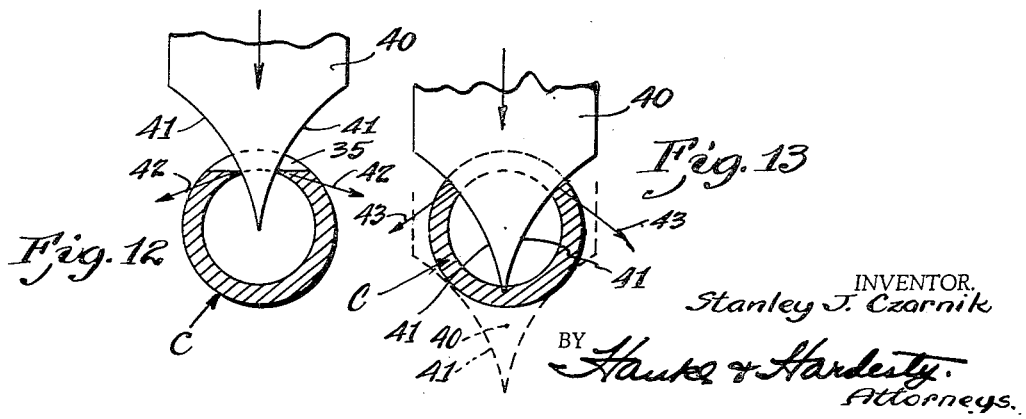

INVENTOR.
Stanley J. Czarnik
BY Hauker Hardesty
Attorneys.

United States Patent Office 2,741,309
Patented Apr. 10, 1956

2,741,309

TUBE CUT-OFF DIE STRUCTURE

Stanley J. Czarnik, Lincoln Park, Mich., assignor, by mesne assignments, to Abdite Industries, Inc., Taylor Center, Mich., a corporation of Michigan Application January 16, 1952, Serial No. 266,690

4 Claims. (Cl. 164—49)

My invention relates to cut-off die structures for tubes, and more particularly to a composite cut-off die adaptable for application with a "flying cut-off or punch press" and so arranged as to travel with the tube as same is continuously fed from the tube rolling machine.

Many types of cut-off machines are utilized for cutting off tubes or other strips, such as channels, angles and the like. Tubes are usually cut-off or sheared and result in a fine internal deformation where said cut is made.

It is an object of the present invention to provide a novel cut-off die structure operable to cut such tubing without leaving this objectionable deformation, this being accomplished by automatically setting up a plurality of cutting operations including an initial notching of the tube and a subsequent shearing of same by a tool operable to exert the shearing force radially outwardly of the tube in the plane of the notch.

Other objects of the invention will be apparent to those skilled in the art as the description progresses, and reference is made to other details of construction as shown in the accompanying drawings illustrating a preferred embodiment thereof in which like parts are referred to by like characters throughout the several views, and in which Fig. 1 is a rear end elevational view of the cut-off mechanism.

Fig. 2 is a similar view showing the operation of the means for clamping the die fixture to the moving tube.

Fig. 3 is a similar elevational view showing the transverse notching of the tube.

Fig. 4 is a similar elevational view showing the retracted transverse cutter and the advancement of the shearing blade.

Fig. 5 is a similar elevational view showing the shearing blade advanced to its fullest extent.

Fig. 6 is a diagrammatic elevational view showing the tube forming machine in connection with the cut-off mechanism.

Fig. 7 is a plan sectional view of the mechanism taken substantially on the line 7—7 of Fig. 2.

Fig. 12 is a detail sectional view showing how the shearing blade enters said notched tube and commences to shear off the tube, and Fig. 13 is a similar detail view showing a further advanced stage of the shearing operation.

Figure 1:
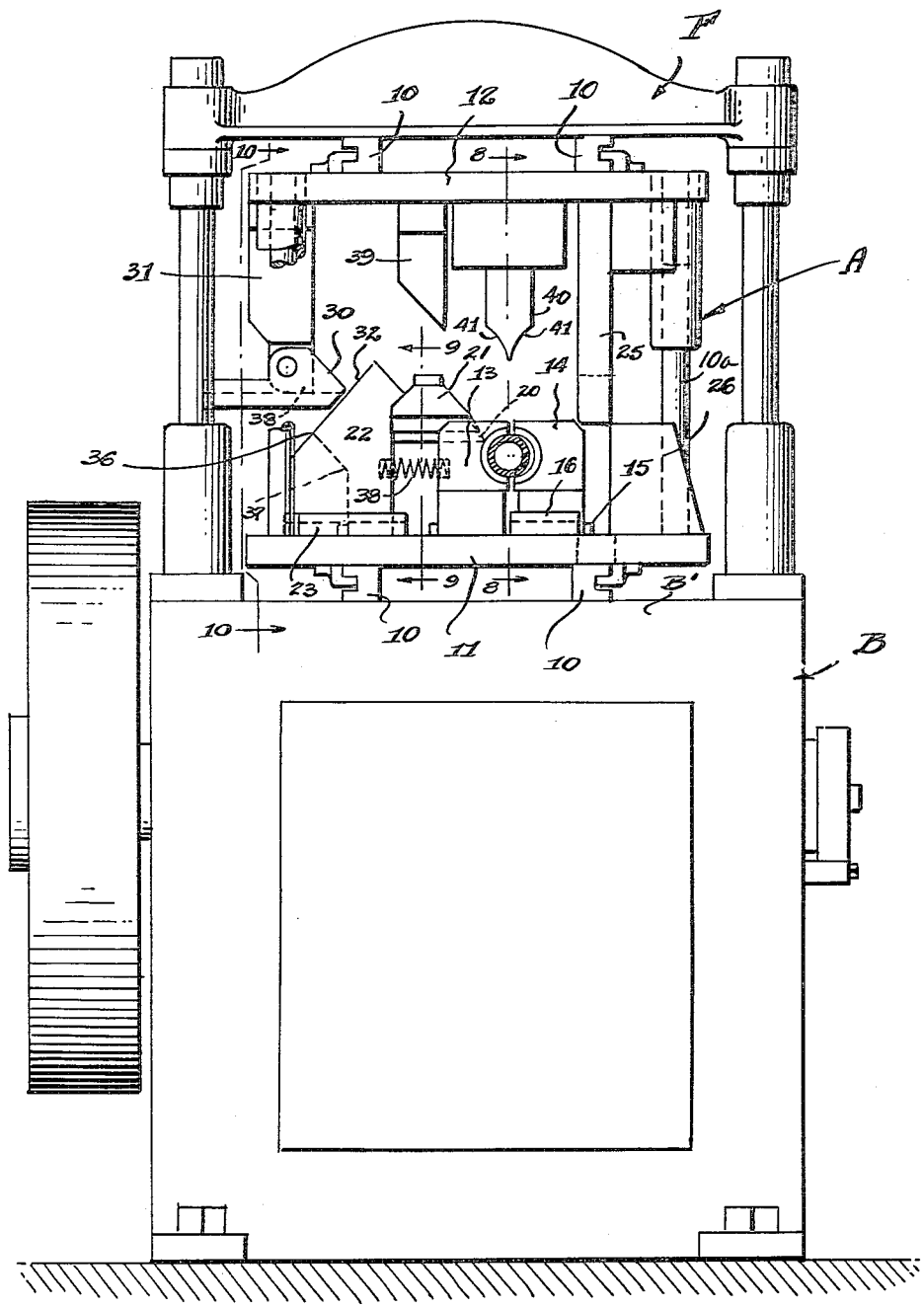
Figure 10:
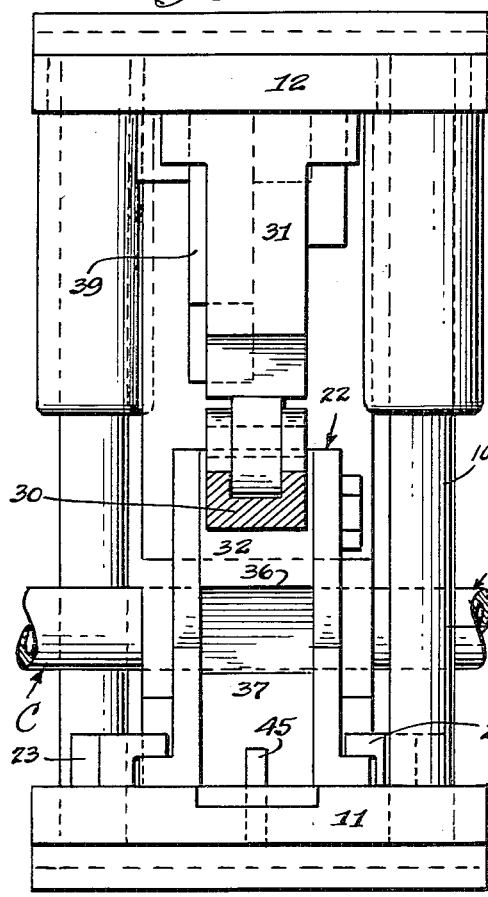
Fig. 10 is a side elevational view of the cut-off die structure taken from the line 10—10 of Fig. 1.
Figure 8:
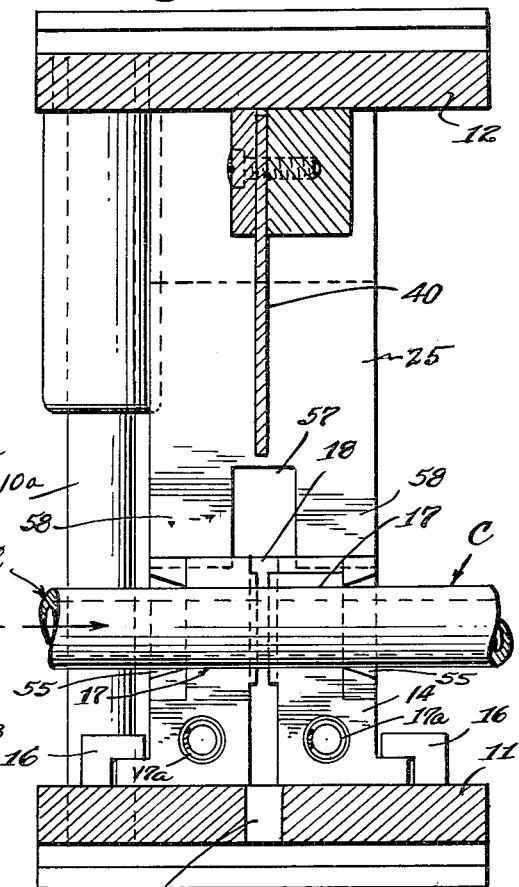
Fig. 8 is a sectional view taken substantially on the line 8—8 of Fig. 1.

The present cut-off die structure A is assembled with a standard type of "flying cut-off or punch press" B, the tubing C being formed and rolled into shape in a tube forming machine D and ejected from said machine in a continuous tube. As the extreme end of the tube engages a tell-tale or other suitable indicator E, it engages the motor M to start said press B in operation. These elements B—D—E and M are all standard devices well known to those skilled in the art, and thus no detailed description of these elements is necessary.

As the press B is put into operation it will lower the ram F of the press in a well known manner, and will stop when one complete cycle of operations is completed. The ram F and the press frame B' carry guides 10 which adjustably or slidably support the cut-off die structure A.

The operation details of the die structure and its operation is clearly illustrated in the elevational views Figs. 1 to 5 inclusive. The bed plate 11 of the die structure is slidably supported in the guides 10 carried by the press frame and the second plate 12 is slidably suspended beneath the ram F, and vertically slidably supported on posts 10a. Two such posts 10a are shown but four posts 10a may be used if desired.

A two part die structure is carried by the bed plate 11, one part 13 being fixed thereon and the other part 14 being slidably supported on said plate 11, a stop 15 limiting the movement of the part 14 in the direction away from part 13, guides 16 being provided to slidably secure the part 14 to the bed plate; and springs 17a serving to exert a force tending to separate the parts. These die parts are provided with semi-circular complementary bores 17 through which the tubing C is threaded, and complementary opening 18 through which the cut-off tool is threaded.

A transverse cutting tool 20 is carried by a tool holder 21 secured to or permanently carried by the fixture or support 22 slidably supported on the plate 11 by guides 23, a spring 38 yieldingly biasing the fixture 22 away from the die structure A, said spring 38 being more specifically disposed between the fixed die part 13 and the fixture 22.

The upper plate 12 has secured thereto a depending cam or plate member 25, which member is constructed to engage the movable die part 14 as same is lowered and guided in the space between the die part 14 and the abutment 26 carried on plate 11. Fig. 1 shows this cam or plate 25 just about to engage the die part 14. Fig. 2 shows the plate 25 fully engaged with the die part 14 and as having cammed over the part 14 towards the part 13, thus clamping the die structure (parts 13 and 14) to the tubing C. Since the tubing is moving along it will thus carry the die structure along, said die structure, indicated as a whole by reference character A, sliding along between plates 11 and 12 along guides 10.

In Fig. 2 it will be noted that the pivoted cam member 30 pivoted to the depending bracket 31 has just engaged the sloping rear face 32 of the fixture 22, and thus upon the further downward movement of the ram F, plate 12 is further lowered carrying with it the plate or wedge 25 and the bracket and pivoted cam member 30. The flat square corner 33 of the bracket limits the counter-clockwise rotation of the cam member 30, and thus, the fixture 22 and cutting tool 20 is moved transversely of the tubing, thereby cutting a notch 35 in the tubing (see Fig. 11). Fig. 3 shows this cutting tool 20 as being advanced into cutting relation with the tubing, and it may be further noted that the cam member 30 is just about to be moved over the edge 36 of the recessed pocket 37 in the rear of the fixture 22. Fig. 4 shows the cam member 30 as having passed over the edge 36, whereupon the compression spring 38 disposed between the fixture 22 and fixed die part 13 is expanded to retract the fixture 22 and the cutting tool 20. If for any reason the spring 38 does not retract the cutting tool 20 due to the sliding fixture 22 binding in the guides 23 or for some other reason, the depending cam member 39 will positively engage the fixture 22 and forceably retract same. Ordinarily the spring 38 will retract the cutting tool 20.

Figure 11:
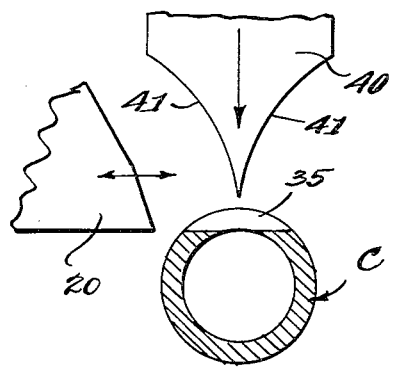
Fig. 11 is a detail showing the notched tube.
Figure 9:
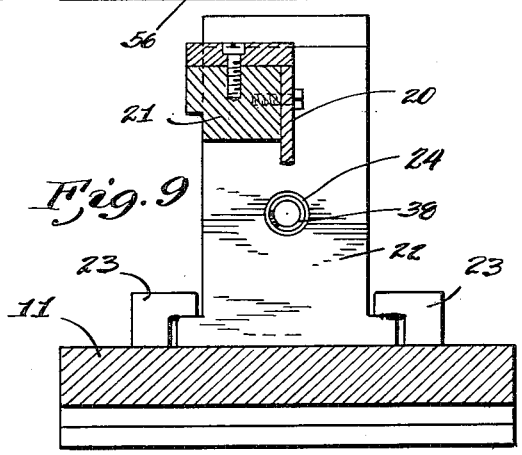
Fig. 9 is another detail sectional view taken substantially on the line 9—9 of Fig. 1.

Fig. 4 shows the fixture 22 and cutting tool 20 retracted and the shearing blade 40 is now just about to enter the opening 18 in the cut-off die (see also Fig. 11). Figs. 12 and 13 show the shearing blade 40 in the process of shearing the tubing and Fig. 5 shows the complete cut-off operation. It will be noted that the curved concave cutting edges 41 of the shearing blade 40 are constructed to exert a shearing force on the tubing wall substantially in a direction as indicated by the arrows 42 and 43 in Figs. 12 and 13 respectively. Thus the shearing forces are exerted substantially radially outwardly of the tube section and the cut-off die functions to provide a clean cut characterized by the absence of internal deformation and burrs at the edges of the cut. The return movement of the ram F returns all elements to the position as shown in Fig. 1, and the clamping element 25 is lifted out of engagement with the movable die part 14, whereupon the springs 17a separate the dies 13 and 14, thus releasing the cut-off die structure from the tube, so that the spring 50 may retract the whole cut-off die structure in readiness for another cycle of operations. Preferably a stop 51 is employed to locate the die structure in readiness for operation. Likewise, a stop 45 is provided to limit the return or retracting movement of the sliding fixture 22.

Preferably the bore 17 is chamfered at each end as at 55. The opening 18 extends through the cut-off die structure and registers with an opening 56 in the plate 11, so that waste cuttings may drop therethrough and be disposed of. The clamping element or plate 25 is recessed as at 57 to clear the stop pin 15 and the lowermost legs 58 of the plate 25 extend to a point below the top surface of the plate 11, holes 59 in the plate 11 providing clearance for the legs 58.

While I have chosen to illustrate one preferred construction of my invention and to describe but one embodiment thereof, it will be apparent to those skilled in the art to which my invention pertains that various modifications and changes may be made therein without departing from the spirit of my invention or from the scope of the appended claims.

I claim:

1. A tube cut-off die structure comprising a bed plate having guide posts, a second plate vertically movably supported on said posts and advanced toward said first plate to actuate the tube clamping and cut-off means, said die structure further comprising die parts gripping said tube, a transverse cutting tool guided by one of said die parts and operable to cut a transverse notch in said tube, and means for actuating said transverse cutting tool comprising a carrier for said cutting tool transversely slidably supported by said first plate and having an inclined cam surface, and an actuating means carried by said second plate and comprising a hanger secured to the second plate and an actuator pivoted to said hanger, said actuator having a cam face engaging the inclined surface of the carrier and operable to advance the transverse cutting tool toward the tubing on advancing the second plate towards the first plate, said cam face of the carrier terminating in an edge and having a recessed portion in the rear face thereof beyond said edge, said actuator arranged to pass over said edge and enter said recessed portion to disengage itself from the carrier cam face, and spring means operable to retract the carrier and cutting tool carried thereby upon disengagement of said actuator with said carrier cam face, said pivotally supported actuator operable on return of said second plate to its original position to swing away from said carrier, said second plate also having a cutter attached thereto in a position to enter said transverse notch, after the retraction of said carrier to complete the severance of said tube.

2. A tube cut-off die structure comprising a bed plate having guide posts, a second plate vertically movably supported on said posts and advanced toward said first plate to actuate the tube clamping and cut-off means, said die structure further comprising die parts gripping said tube, a transverse cutting tool guided by one of said die parts and operable to cut a transverse notch in said tube, and means for actuating said transverse cutting tool comprising a carrier for said cutting tool transversely slidably supported by said first plate and having an inclined cam surface, and an actuating means carried by said second plate and comprising a hanger secured to the second plate and an actuator pivoted to said hanger, said actuator having a cam face engaging the inclined surface of the carrier and operable to advance the transverse cutting tool toward the tubing on advancing the second plate towards the first plate, said cam face of the carrier terminating in an edge and having a recessed portion in the rear face thereof beyond said edge, said actuator arranged to pass over said edge and enter said recessed portion to disengage itself from the carrier cam face, and spring means operable to retract the carrier and cutting tool carried thereby upon disengagement of said actuator with said carrier cam face, said second plate provided with a depending arm having an inclined lower face operable to engage said carrier and to forcibly retract the carrier in the event of failure of the spring means aforesaid to do so, said pivotally supported actuator freely swinging away from actuating engagement with said carrier on the upward travel of said second plate to original starting position, said second plate also having a cutter attached thereto in a position to enter said transverse notch, after the retraction of said carrier to complete the severence of said tube.

3. A tube cut-off die structure comprising a bed plate having guide posts, a second plate vertically movably supported on said posts and advanced toward said first plate to actuate the tube clamping and cut-off means, said die structure further comprising die parts gripping said tube, a transverse cutting tool guided by one of said die parts and operable to cut a transverse notch in said tube, and means for actuating said transverse cutting tool comprising a carrier for said cutting tool transversely slidably supported by said first plate and having an inclined cam surface, and an actuating means carried by said second plate and comprising a hanger having an abutment secured to the second plate and an actuator pivoted to said hanger, said actuator seated against said abutment and having a cam face engaging the inclined surface of the carrier and operable to advance the transverse cutting tool toward the tubing on advancing the second plate towards the first plate, said cam face of the carrier terminating in an edge and having a recessed portion in the rear face thereof beyond said edge, said actuator arranged to pass over said edge and enter said recessed portion to disengage itself from the carrier cam face, and spring means operable to retract the carrier and cutting tool carried thereby upon disengagement of said actuator with said carrier cam face, said second plate provided with a depending arm having an inclined lower face operable to engage said carrier and to forcibly retract the carrier in the event of failure of the spring means aforesaid to do so, a tube shearing blade carried by said second plate and placed to be so timed to initially engage said tube to complete the cut-off of said tube only after said carrier and transverse cutting tool carried thereby have been retracted, said transverse cutting tool and said tube shearing blade operable in the same plane, said actuator contacting the abutment on actuating said carrier and restrained by said abutment from rotation on its pivot in one direction, but free to rotate in the other direction on return of the second plate to its original starting position.

4. A tube cut-off die structure comprising a bed plate having guide posts, a second plate vertically movably supported on said posts and advanced toward said first plate to actuate the tube clamping and cut off means, said die structure further comprising die parts gripping said tube, a transverse cutting tool guided by one of said die parts and operable to cut a transverse notch in said tube, and means for actuating said transverse cutting tool comprising a carrier for said cutting tool transversely slidably supported by said first plate and having an inclined cam surface, and an actuating means carried by said second plate and comprising a hanger secured to the second plate and an actuator pivoted to said hanger, said actuator having a cam face engaging the inclined surface of the carrier and operable to advance the transverse cutting tool toward the tubing on advancing the second plate toward the first plate, said cam face of the carrier terminating in an edge and having a recessed portion in the rear face thereof beyond said edge, said actuator arranged to pass over said edge and enter said recessed portion to disengage itself from the carrier cam face, and spring means operable to retract the carrier and cutting tool carried thereby upon disengagement of said actuator with said carrier cam face, said second plate provided with a depending arm having an inclined lower face operable to engage said carrier and to forcibly retract the carrier in the event of failure of the spring means aforesaid to do so, a tube shearing blade carried by said second plate and placed to be so timed to initially engage said tube to complete the cut-off of said tube only after said carrier and transverse cutting tool carried thereby have been retracted, said transverse cutting tool and said tube shearing blade operable in the same plane, a prime mover, and means connecting same with said second plate to actuate same, said prime mover having guides and said cut off die structure slidably supported on said guides, the movement of said tube carrying said cut-off die structure along with the tube, all said cutting operations being carried out within the time said tube and die structure are moving together, and means to return said die structure to its starting position on retraction of both said cutters and the disengagement of said die structure with said tube, the return movement of the second plate operable to retract the shearing blade and unclamp the tube from said die, said pivotally supported actuator mounted to swing freely aside from operating engagement with said corner on the said return movement of the second plate.

References Cited in the file of this patent

UNITED STATES PATENTS

| | | |
|---|---|---|
| Re. 22,114 | Borzym | June 16, 1942 |
| 1,269,635 | Neuman | June 18, 1918 |
| 1,498,550 | Johnston | June 24, 1924 |
| 1,800,005 | Braun | Apr. 7, 1931 |
| 2,155,396 | Borzym | Apr. 25, 1939 |
| 2,243,614 | Vogel | May 27, 1941 |
| 2,250,931 | Grieder | July 29, 1941 |
| 2,361,595 | Broersma | Oct. 31, 1944 |